(12) United States Patent
de la Hamayde

(10) Patent No.: US 8,375,850 B2
(45) Date of Patent: Feb. 19, 2013

(54) PRESSURE GAUGE

(75) Inventor: Sebastien de la Hamayde, Leicester (GB)

(73) Assignee: Vivid Laminating Technologies Limited, Coalville (GB)

( * ) Notice: Subject to any disclaimer, the term of this patent is extended or adjusted under 35 U.S.C. 154(b) by 0 days.

(21) Appl. No.: 12/992,828

(22) PCT Filed: May 19, 2009

(86) PCT No.: PCT/GB2009/001241
§ 371 (c)(1),
(2), (4) Date: Nov. 15, 2010

(87) PCT Pub. No.: WO2009/141594
PCT Pub. Date: Nov. 26, 2009

(65) Prior Publication Data
US 2011/0067816 A1    Mar. 24, 2011

(30) Foreign Application Priority Data
May 19, 2008    (GB) .................................. 0809035.9

(51) Int. Cl.
*B41L 35/06*    (2006.01)
(52) U.S. Cl. .................. 100/168; 74/813 R; 74/815
(58) Field of Classification Search .............. 74/813 R, 74/815, 822, 824, 528, 545; 100/168, 169, 100/171; 72/237; 82/159; 68/256, 262 R; 192/99 R, 99 A, 99 B, 89.26; 116/232, 291
See application file for complete search history.

(56) References Cited

U.S. PATENT DOCUMENTS

| | | | | |
|---|---|---|---|---|
| 204,701 A * | 6/1878 | Baldwin | ........................... | 38/49 |
| 867,762 A * | 10/1907 | Sproat | ........................... | 100/131 |
| 1,108,936 A * | 9/1914 | Sintz | ........................... | 192/89.26 |
| 1,339,047 A * | 5/1920 | Vincent | ........................... | 192/70.29 |
| 2,319,480 A * | 5/1943 | Saving et al. | ................. | 409/145 |
| 3,336,865 A * | 8/1967 | Brand | ........................... | 101/158 |
| 3,536,031 A * | 10/1970 | Charles | ........................ | 116/232 |
| 3,561,359 A * | 2/1971 | Cohen | ........................... | 101/250 |
| 3,714,924 A * | 2/1973 | Jankowski et al. | ........... | 116/232 |
| 3,804,013 A * | 4/1974 | Martin | ........................... | 101/250 |
| 4,127,066 A | 11/1978 | Sharkey | | |
| 5,810,965 A | 9/1998 | Fwu | | |
| 5,967,280 A | 10/1999 | Liu | | |
| 2007/0235142 A1 | 10/2007 | Chou | | |

FOREIGN PATENT DOCUMENTS

| | | |
|---|---|---|
| AT | 379278 B1 | 12/1985 |
| EP | 0979730 A2 | 2/2000 |
| GB | 462965 | 3/1937 |

* cited by examiner

*Primary Examiner* — Richard W Ridley
*Assistant Examiner* — Thomas Diaz
(74) *Attorney, Agent, or Firm* — Clifford Kraft

(57) ABSTRACT

A pressure gauge where a main wheel (11) is rotated to raise and lower the upper one of two horizontal feed rollers of a laminating machine so that the pressure applied by the rollers is the same in successive operations. A mark on an indexing wheel (14), which rotates with the main wheel (11), is brought into alignment with a mark on the casing (10) of the machine. The outer ring (14) of the indexing wheel is manually rotatable relative to its inner ring (13), but is held in frictional contact with the main wheel (11) by compression springs (17).

2 Claims, 1 Drawing Sheet

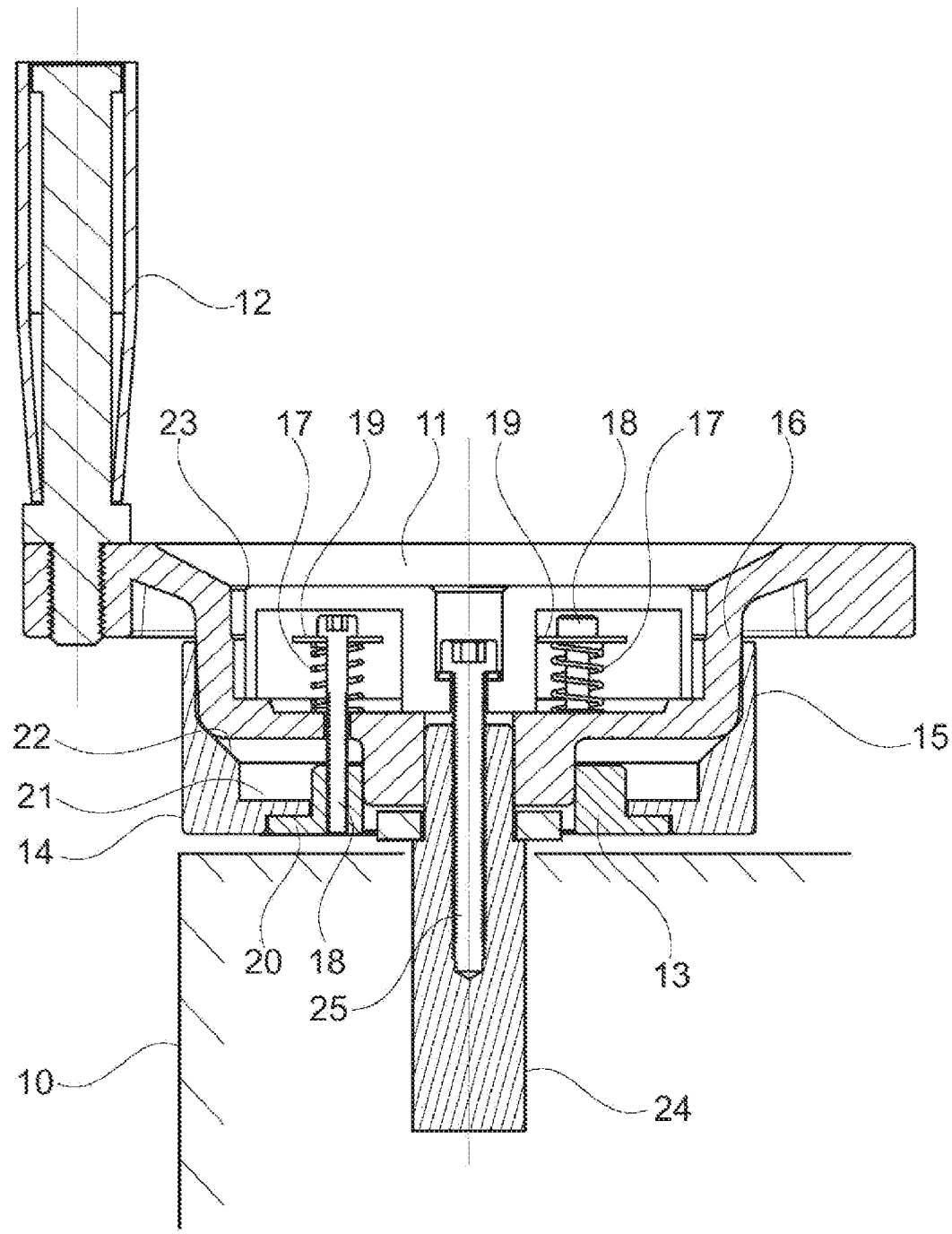

PRESSURE GAUGE

This application claims priority to PCT/GB09/001,241 filed May 19, 2009 which claimed priority to British application no. GB 0809035.9 filed May 19, 2008.

BACKGROUND

1. Field of the Invention

This invention relates to a pressure gauge and more particularly an to improved system whereby the position of an indexing wheel relative to a pressure-applying wheel can be maintained more reliably in a machine of the kind in which a feed roller is pressed into contact with a workpiece by rotation of the pressure-applying wheel.

2. Description of the Prior Art

An example of such a machine is a laminating machine in which upper and lower feed rollers, which have the function of feeding through the machine a sheet to be laminated together with laminating film, are moved together or apart by the manual rotation of a main wheel. Between the casing of the machine and the main wheel is an indexing wheel which normally rotates with the main wheel but which can be manually rotated relative to the main wheel to bring an indexing mark on the indexing wheel into alignment with a mark on the machine casing. An optimum pressure for a given thickness of the workpiece (sheet to be laminated and laminating film) is found by trial and error and the angular position of the main wheel when this optimum pressure is achieved is registered by aligning the two marks. In subsequent operations with workpieces of the same constitution and thickness the operator ceases to turn the main wheel when the two marks come into alignment.

Hitherto the main and indexing wheels have been pressed into frictional contact by a screw-threaded arrangement. If this is too tight the indexing wheel cannot be rotated manually relative to the main wheel. If it is too loose the indexing wheel will not reliably rotate with the main wheel so that the two marks come into alignment with the main wheel at a different angular position from its previous one. If to overcome this problem the operator first tightens the screw-threaded arrangement to ensure that the indexing wheel rotates with the main wheel, then slackens it to adjust the indexing wheel, then re-tightens it this makes for a laborious operation which wastes the operator's time.

SUMMARY OF THE INVENTION

A principal object of the present invention is to provide a solution to this is problem, avoiding the necessity to loosen and tighten a screw-threaded connection between the main and indexing wheels.

In accordance with the present invention there is provided a machine comprising a main wheel rotatable to adjust the pressure applied by another component of the machine to a workpiece and an indexing wheel in frictional engagement with the main wheel to rotate therewith but manually rotatable relative to the main wheel to bring an indexing mark on the indexing wheel into alignment with a mark on a stationary part of the machine adjacent the indexing wheel, characterised in that the indexing wheel is spring-biased into contact with the main wheel, the spring bias being sufficient to prevent accidental displacement of the indexing wheel while capable of being overcome when the indexing wheel is manually adjusted relative to the main wheel.

DESCRIPTION OF THE FIGURE

Attention is now drawn to a drawing that illustrates features of the present invention:

FIG. 1 shows a cross-section of an embodiment of the present invention.

The drawing has been provided to aid in understanding the invention. The scope of the present invention is not limited to what is shown in the FIGURE.

DESCRIPTION OF THE PREFERRED EMBODIMENT

In a preferred embodiment the machine is a laminating machine and the other component is an upper one of two horizontal feed rollers which are moved together or apart by rotating the main wheel.

The indexing wheel may comprise an inner ring rotatable with the main wheel and an outer ring rotatable relative to the inner ring and having said indexing mark on an outer periphery thereof, spring means being provided to draw together the main wheel and the inner ring of the indexing wheel and the inner ring acting to press the outer ring into frictional engagement with the main wheel.

The outer ring may have a skirt which surrounds a hub portion of the main wheel and a chamfered internal surface which contacts a shoulder of the hub.

The spring means may be provided by a plurality of compression springs separated circumferentially of the hub of the main wheel, each surrounding a respective bolt which passes through the hub and engages the inner ring of the indexing wheel.

A preferred embodiment of the invention will now be described by way of non-limitative example with reference to the accompanying drawing, which illustrates in sectional elevation the assembly of a main and an indexing wheel for controlling the pressure applied to a workpiece by feed rollers of a laminating machine.

A laminating machine has a casing 10 containing, inter alia, upper and lower, horizontal feed rollers (not shown) which are moved together and apart by rotating a main wheel 11 by means of a handle 12 to rotate a shaft 24. An indexing wheel has an inner ring 13 and a relatively rotatable outer ring 14, the latter having an annular skirt 15 which rides around a hub 16 of the main wheel 11. The inner ring 13 is drawn toward the main wheel 11 by compression springs 17 which surround respective bolts 18 which are screw-threaded into the inner ring 13, the heads of the bolts 18 retaining washers 19 to keep the springs 17 in compression between the washers 19 and the hub 16 of the main wheel. A peripheral flange 20 of the inner ring 13 overlaps a peripheral flange 21 of the outer ring 14, causing the springs 17 to press a chamfered internal surface 22 of the outer ring 14 into frictional engagement with a shoulder of the hub 16 of the main wheel 11.

The springs 17 are concealed by a cap 23 which is secured to the shaft 24 by a bolt 25.

The top of the casing 10 has, adjacent the indexing wheel, a stationary indexing mark (not shown). The outer periphery of the outer ring 14 of the indexing wheel also has an indexing mark (not shown).

In use of the apparatus described the optimum pressure to be applied by the feed rollers to a workpiece of given consistency and thickness is found by trial and error and the angular position of the main wheel 11 when this optimum pressure is applied is then registered by manually rotating the outer ring 14 of the indexing wheel relative to its inner ring 13 until the two marks are in alignment. In subsequent operations rotation of the main wheel 11 is halted when the two marks are aligned. It is not necessary to release or tighten a screw and yet the outer ring 14 of the indexing wheel is held in sufficient frictional engagement with the main wheel 11 to ensure that it is not accidentally angularly displaced relative to the main wheel during rotation with the main wheel.

Several descriptions and illustrations have been provided to aid in understanding the present invention. One skilled in the art will understand that numerous changes and variations can be made without departing from the spirit of the invention. Each of these changes and variations is within the scope of the present invention.

The invention claimed is:

1. A machine comprising a main wheel configured to rotate on a shaft to adjust pressure applied by the machine to a workpiece, and an indexing wheel in frictional engagement with the main wheel to rotate therewith; the indexing wheel also being manually rotatable relative to the main wheel, wherein the indexing wheel is spring-biased into contact with the main wheel, the spring bias being sufficient to prevent accidental displacement of the indexing wheel while capable of being overcome when the indexing wheel is manually adjusted relative to the main wheel, the spring bias being provided by a plurality of adjustable compression springs in contact with the main wheel;
    wherein the indexing wheel includes an inner ring rotatable with the main wheel and an outer ring rotatable relative to the inner ring;
    and wherein the outer ring has a skirt which surrounds a hub portion of the main wheel and a chamfered internal surface which contacts a shoulder of the hub.

2. A machine comprising a main wheel configured to rotate on a shaft to adjust pressure applied by the machine to a workpiece, and an indexing wheel in frictional engagement with the main wheel to rotate therewith; the indexing wheel also being manually rotatable relative to the main wheel, wherein the indexing wheel is spring-biased into contact with the main wheel, the spring bias being sufficient to prevent accidental displacement of the indexing wheel while capable of being overcome when the indexing wheel is manually adjusted relative to the main wheel, the spring bias being provided by a plurality of adjustable compression springs in contact with the main wheel;
    wherein the indexing wheel includes an inner ring rotatable with the main wheel and an outer ring rotatable relative to the inner ring;
    wherein the outer ring has a skirt which surrounds a hub portion of the main wheel and a chamfered internal surface which contacts a shoulder of the hub;
    and wherein the compression springs are separated circumferentially of the hub portion of the main wheel, each compression spring surrounding a respective bolt which passes through the hub portion and engages the inner ring of the indexing wheel, each bolt having a washer.

* * * * *